United States Patent
Flacke et al.

(10) Patent No.: US 6,222,486 B1
(45) Date of Patent: Apr. 24, 2001

(54) METHOD FOR THE PRECISE ANGLE DETERMINATION OF TARGETS BY MEANS OF A MULTIPLE-UNIT RADAR SYSTEM

(75) Inventors: Joachim Flacke, Markdorf; Kuno Heckel, Friedrichshafen; Bruno Kaiser, Oberschopfheim, all of (DE)

(73) Assignee: Dornier GmbH, Friedrichshafen (DE)

( * ) Notice: Subject to any disclaimer, the term of this patent is extended or adjusted under 35 U.S.C. 154(b) by 0 days.

(21) Appl. No.: 09/406,694

(22) Filed: Sep. 27, 1999

(30) Foreign Application Priority Data

Sep. 26, 1998 (DE) ............................................... 198 44 239

(51) Int. Cl.⁷ ....................................................... G01S 5/04
(52) U.S. Cl. ............................................ 342/432; 342/439
(58) Field of Search ..................................... 342/432, 433, 342/434, 435, 436, 437, 438, 439, 440, 75, 77, 80, 89, 90

(56) References Cited

U.S. PATENT DOCUMENTS 3,725,937 * 4/1973 Schreiber ............................. 342/433

* cited by examiner

Primary Examiner—Thomas H. Tarcza
Assistant Examiner—Fred H Mull
(74) Attorney, Agent, or Firm—Evenson, McKeown, Edwards & Lenahan, P.L.L.C.

(57) ABSTRACT

In a method for the precise angle determination of targets by means of a multiple unit antenna radar system, individual antenna patterns are generated in separate directions by at least three feeds (F–1, F0, F1) which are spatially offset with respect to one another and which illuminate a joint collimator (R). By simultaneous and phase-correct excitation of several of the feeds, at least two combination antenna diagrams are generated, by means of which the angle determination takes place. The intersecting points of the combination antenna diagrams, are situated in angle ranges in which the exact angle determination is desired.

10 Claims, 4 Drawing Sheets

METHOD FOR THE PRECISE ANGLE DETERMINATION OF TARGETS BY MEANS OF A MULTIPLE-UNIT RADAR SYSTEM

BACKGROUND AND SUMMARY OF THE INVENTION

This application claims the priority of German patent document 198 44 239.4, filed Sep. 26, 1998, the disclosure of which is expressly incorporated by reference herein.

The invention relates to a method for precise angle determination by means of a multiple-unit antenna radar system.

Several different methods are known for determining a target direction by means of radar. In the sequential lobing method (M. I. Skolnik, "Introduction to Radar Systems", McGraw-Hill 1980, Pages 153, 154), the echo signals in two antennas with different main beaming directions are superimposed, from which the precise direction to a target can be determined in a known manner. Although this method is very precise in the angular vicinity of the intersecting points of the antenna diagrams, major errors may occur in the angle range of the main beaming directions of the individual antennas, because of the form of the antenna diagrams.

The typical antenna diagrams with the pertaining discriminator curve are illustrated in FIG. 1. The upper portion of FIG. 1 is a graphic presentation of curves A1, A2 representing signal amplitude as a function of beaming angle $\Phi$ for each of the two participating antennas. (This schematic depiction illustrates only the major lobes without side lobes.) The lower portion of FIG. 1, on the other hand, shows the corresponding characteristic discriminator curve D1/2. In the sequential lobing method, the values of the characteristic curve are calculated from the amplitudes of the two antenna diagrams and are proportional to $(A1-A2)/A1+A2)$ for a give angle $\Phi$.

As illustrated in FIG. 1, the characteristic discriminator curve is very steep in the range of $\Phi=0°$, so that, in the intersecting points of the antenna diagrams, a very precise angle determination can be carried out. In contrast, it is flat in the range of the respective main beaming directions (maximal amplitude) of the two antennas so that the angle measurement for targets in this angle range can only be carried out imprecisely.

With such two-unit antenna systems, ambiguities may occur when several targets are present, because two similar targets, which each exist in the range of the main beaming directions of the antennas, may be protected by the system into the center ($\Phi=0$). Inversely, a target may be divided from the center into two outer targets. In order to avoid this problem, particularly in the case of radar systems which are used on movable carriers for detecting the environment in the moving direction (such as motor vehicle ranging radar), frequently three-unit or five-unit antenna systems are used. In these systems, the main beaming direction of the center antenna points in the direction of movement.

The typical antenna diagrams A-1, A0, A1 of the participating antennas, together with the pertaining discriminator curves D0/−1, D0/1 in a three-unit antenna system are illustrated in FIG. 2, which demonstrates the disadvantage of systems with an odd number of antennas. The highest precision in the angle determination is achieved in the intersecting points of the antenna diagrams A-1, A0, A1, while, in the angle ranges of the main beaming directions of the antennas, because of the high directivity of the individual antennas (required for achieving a good angle resolution), the discriminator curve is very flat. This means that the angle error becomes relatively large there. In particular, the angle ranges with a flat discriminator curve include the main beaming direction of the radar system ($\Phi=0°$) which, in applications on movable carriers, frequently coincides with the direction of movement of the carrier.

An example of the technical construction of a multiple-unit antenna radar system, which can be used for the angle determination of a target, is illustrated in FIG. 3 (in this case, a three-unit antenna system). Radar systems according to FIG. 3 are known per se, and are used particularly in motor vehicle ranging radar systems. The illustrated radar system comprises three so-called feeds F-1, F0, F1 (also called feed points of the antenna) which can be individually controlled by way of an antenna change-over switch AU. The feeds are arranged to be spatially offset; in FIG. 3, for example, at different points of a straight line. The feeds illuminate a joint collimator, which here is constructed as a reflector R. (However, a lens, for example, may also be used.) Each of the respective individual antenna diagrams is produced by separate control of a different feed.

It is an object of the present invention to provide an angle determination method using a multiple-unit antenna radar system, that can achieve highly precise results, even in angle ranges in which only an indistinct measurement could be made heretofore.

Another object of the invention is to achieve such precision without installing additional antennas.

These and other objects and advantages are achieved by the method according to the invention, in which the individual antenna directions are generated by at least three feeds that are spatially offset with respect to one another and which illuminate a common collimator. With such a radar system, it is possible to produce several combination antenna diagrams by the simultaneous and phase-correct activation of at least two of the feeds; and a highly precise angle determination can be made by means of such combination antenna diagrams. According to the invention, combination antenna diagrams are generated so that their intersecting points are situated in angle ranges in which an exact angle determination is desired; particularly where the known separate control of the individual feeds achieves only an imprecise angle determination.

The method according to the invention is suitable for all multiple-unit antenna radar systems which have three or more spatially offset feeds. The number of feeds may be either odd or even; and the pertaining joint collimator may be constructed in particular as a lens or a reflector.

For actual angle determination on the basis of the generated combination antenna diagrams, the sequential lobing method can be used. However, other angle measuring processes which are known per se may also be used.

In many cases, it is especially important that a precise angle measurement be carried out in the main beaming direction of the multiple-unit antenna radar system (which in mobile applications, is frequently coincident with the direction of movement of the carrier). In order to achieve this precise angle measurement by controlling the feeds according to the invention, two combination antenna diagrams are constructed with their intersecting point situated precisely in the area of the main beaming direction of the radar system. Preferably, the combination antenna diagrams are symmetrical with respect to the main beaming direction of the radar system. Angle measurements can be made outside the main beaming direction by means of conventional methods; that is, the individual controlling of the feeds.

The method according to the invention has the advantage that additional precision can be achieved simply by a change in the control of the feeds. (A change of the hardware of the radar system is not required.) Therefore, a change-over can take place from the known measuring method (angle determination on the basis of the individual antenna diagrams) to the method according to the invention, so that the complete angle range can be covered with high precision, simply by means of appropriate software.

The method according to the invention can be used particularly in range warning radar systems on movable carriers, for example, in a motor vehicle, train or ship.

Other objects, advantages and novel features of the present invention will become apparent from the following detailed description of the invention when considered in conjunction with the accompanying drawings.

DETAILED DESCRIPTION OF THE DRAWINGS

Figure 1:
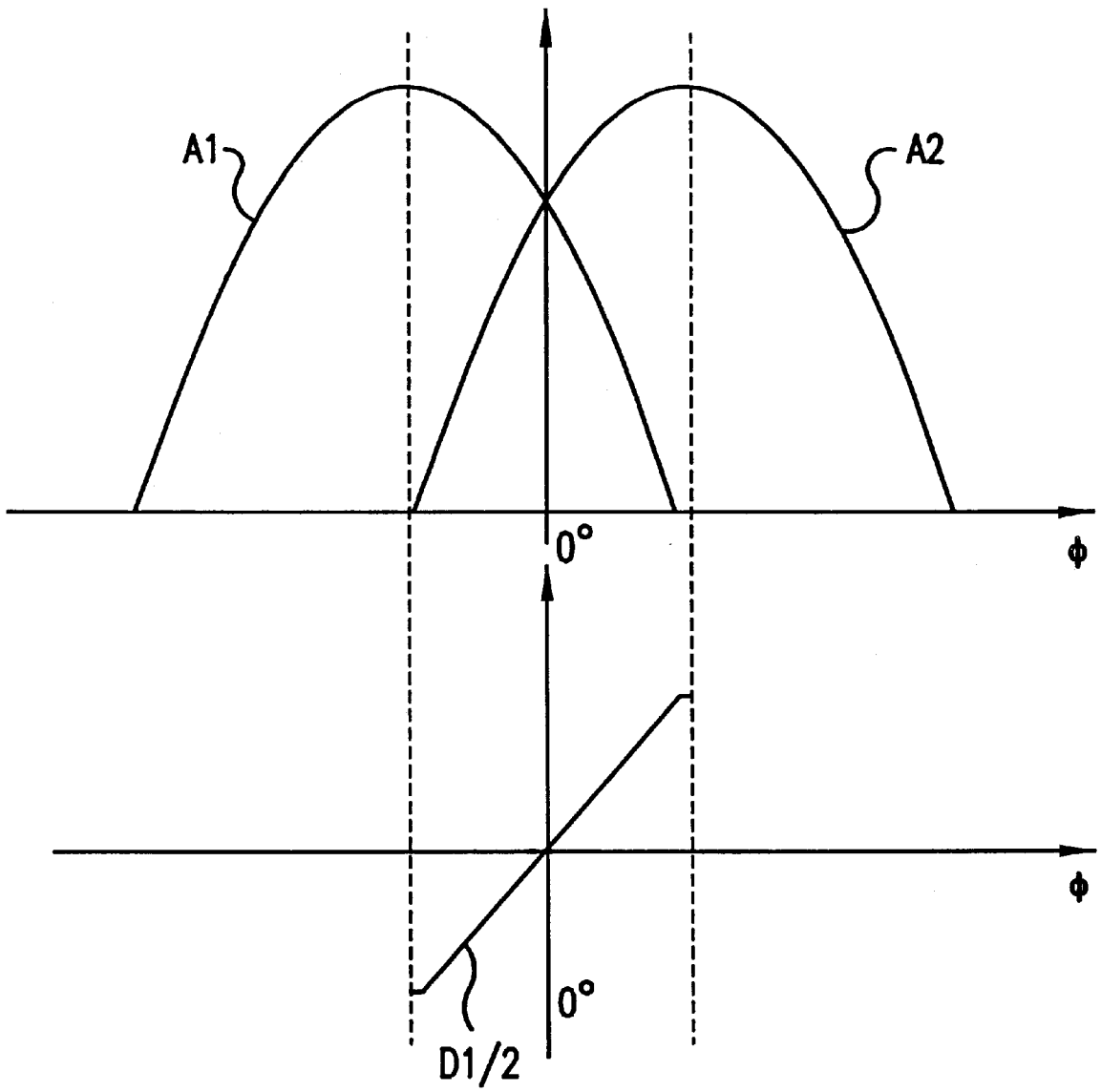
FIG. 1 shows antenna diagrams and a characteristic discriminator curve of a two-unit antenna radar system, using a known method for the angle determination.
Figure 2:
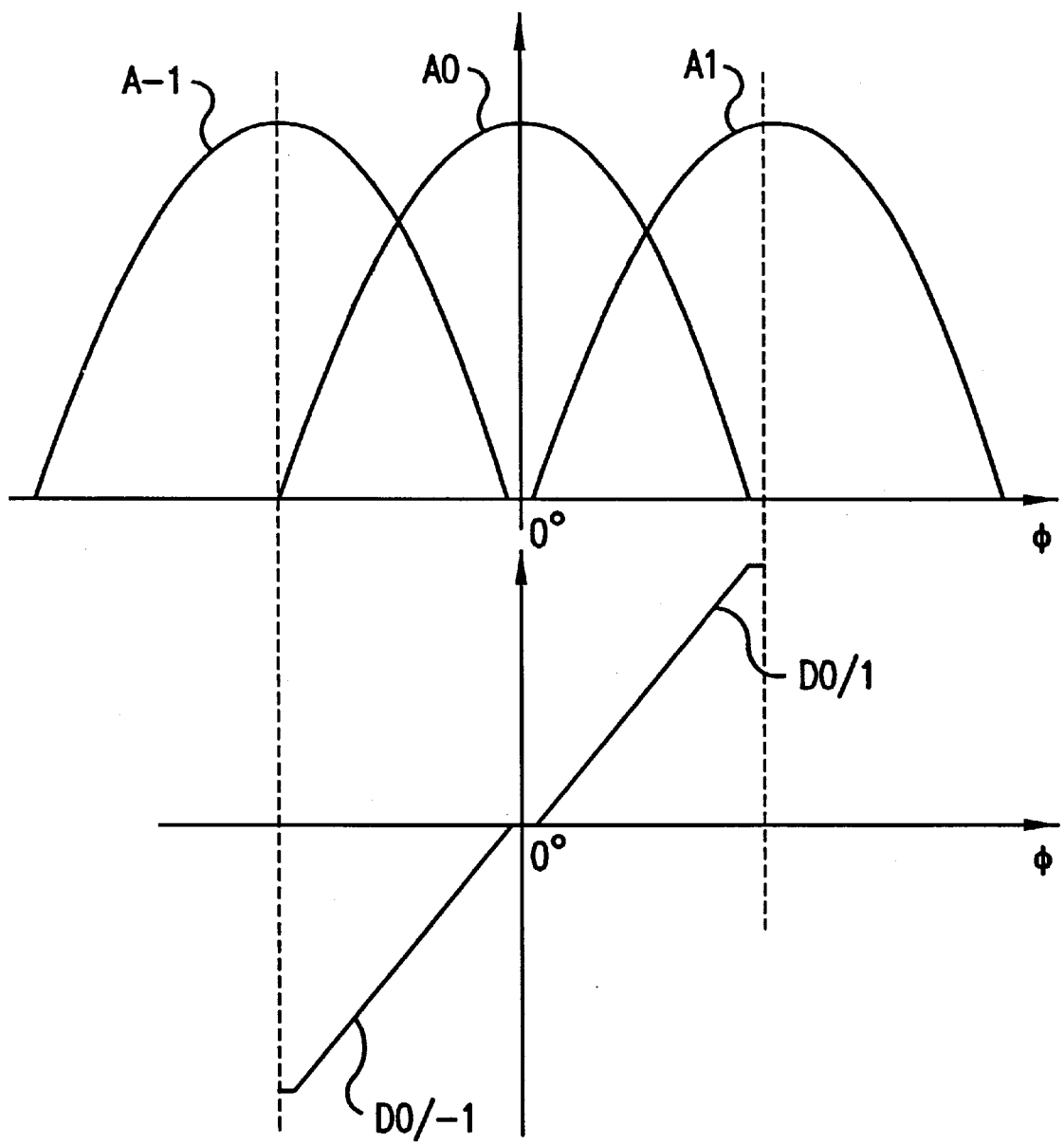
FIG. 2 shows antenna diagrams and characteristic discriminator curves of a three-unit antenna radar system, using a known method for the angle determination.
Figure 4:
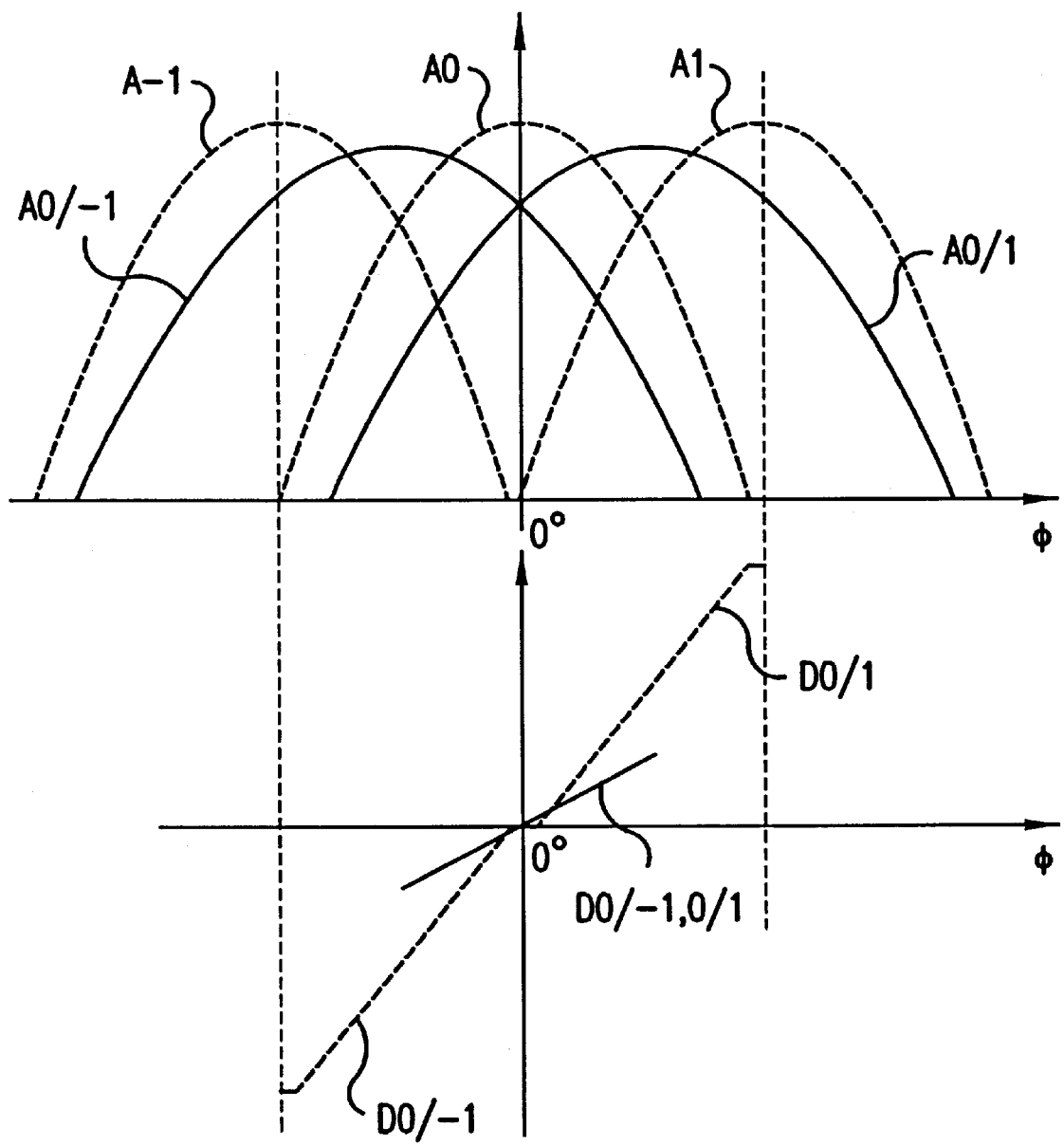
FIG. 4 shows antenna diagrams and characteristic discriminator curves of a three-unit antenna radar system using the angle determination method according to the invention.

FIG. 4 illustrates the antenna diagrams (upper curves) and the pertaining characteristic discriminator curves (lower curves) in the application of the method according to the invention using a three-unit antenna radar system. The three antenna diagrams A-1, A0, A1, which are generated by separate control of the individual feeds, are shown by broken lines. These correspond to the antenna diagrams according to FIG. 2. As described there, the pertaining characteristic discriminator curves D0/-1, D0/1 (also shown in the lower diagram of FIG. 4 by a broken line), particularly in the range of the main beaming direction of the radar system ($\Phi=0°$), are very flat, which leads to an imprecise angle measurement.

Figure 3:
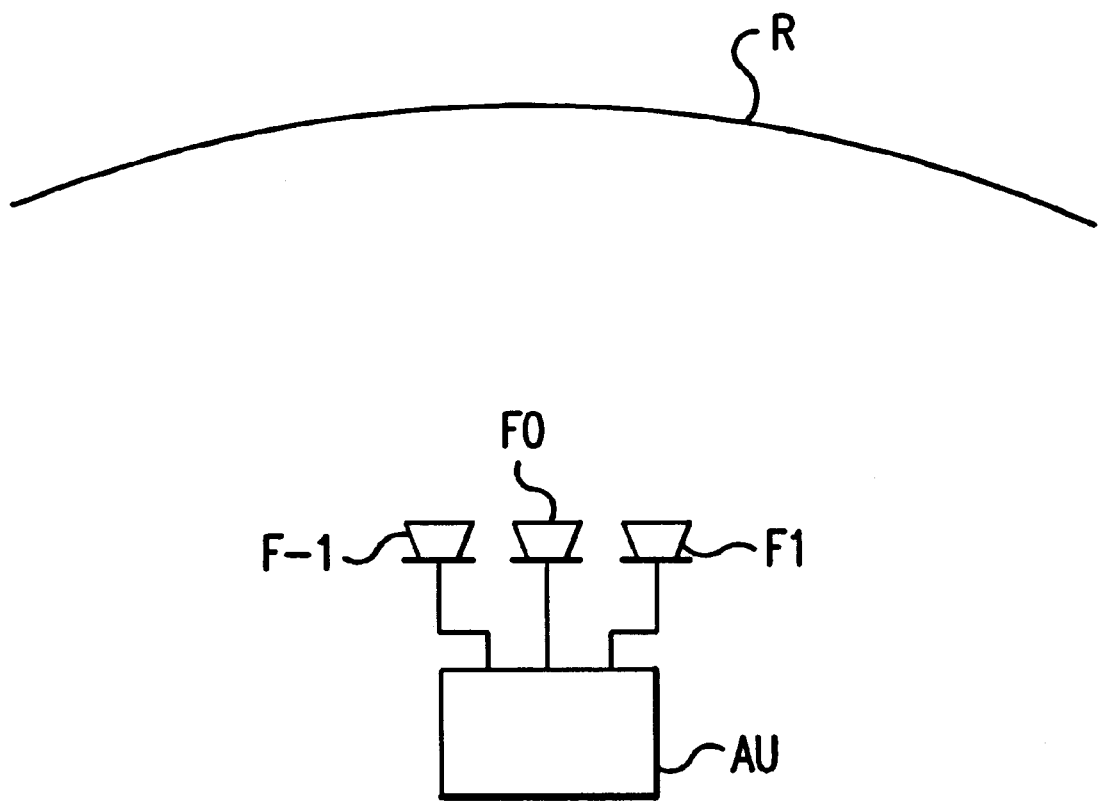
FIG. 3 shows a three-unit antenna radar system which is used to implement the angle determination method according to the invention.

In order to overcome this disadvantage, according to the invention, two of the feeds are activated simultaneously and with the same phase. The combination antenna diagram which results from the simultaneous and phase-correct excitation of one of the two outer feeds F-1 (see FIG. 3) together with the intermediate feed F0, is illustrated in FIG. 4, upper representation, designed by the reference number A0/-1 (solid line). The combination antenna diagram which results from the simultaneous and phase-correct excitation of the intermediate feed F0 together with the other outer feed F1 is designed by the reference number A0/1 in FIG. 4.

The two combination diagrams A0/-1 and A0/1 have larger lobe widths than the antenna diagrams A-1, A0, A1 in the case of an individual control; and significantly they have an intersecting point at $\Phi=0°$. For this reason, a highly precise angle determination can be made in this angle range. (The pertaining characteristic discriminator curve D0/-1, 0/1 (solid line) has a steep slope there.) In the remaining angle ranges, the angle determination can continue to be made by the conventional method, since there the pertaining characteristic discriminator curves D0/-1, D0/1 are sufficiently steep.

The principle according to the invention is not limited to radar systems with three feeds but can be applied to systems with an arbitrary number of feeds larger than three. In this case, the number of feeds increases, so also does the number of combination possibilities for their control. Thus, in the case of a system with four feeds, combination antenna diagrams can be produced by the simultaneous and phase-correct controlling of two or three feeds. By individual selection of the individual feeds, additional variation possibilities exist. For example, if, in the case of a four feed system, the simultaneous and phase-correct controlling of precisely two feeds is defined, the two is exterior feeds, for example, may be selected; or the two interior feeds which have a smaller spatial distance from one another. This achieves a large variability which permits the approximately free selection of angle ranges for the measuring with a high precision.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of angle determination by means of a multiple unit antenna radar system in which individual antenna patterns are generated in separate directions by at least three feeds which are spatially offset relative to one another and which illuminate a joint collimator, comprising:

simultaneous and phase-correct excitation of a plurality of the feeds to generate at least two combination antenna patterns having intersecting points situated in angle ranges in which a precise angle determination is desired; and determining said angle by means of said combination antenna patterns.

2. A method according to claim 1, wherein the combination antenna patterns have an intersecting point which coincides substantially with a main beaming direction of the multiple-unit antenna radar system.

3. A method according to claim 2, wherein the combination antenna diagrams are mutually symmetrical with respect to a main beaming direction of the multiple-unit antenna radar system.

4. A method according to claim 2, wherein said determining of said angle is performed by means of sequential lobing.

5. A method according to claim 1, wherein the combination antenna diagrams are mutually symmetrical with respect to a main beaming direction of the multiple-unit antenna radar system.

6. A method according to claim 5, wherein said determining of said angle is performed by means of sequential lobing.

7. A method according to claim 1, wherein said determining of said angle is performed by means of sequential lobing.

8. A method according to claim 1, wherein the combination antenna patterns have an intersecting point which coincides substantially with a main beaming direction of the multiple-unit antenna radar system.

9. A method according to claim 1, wherein the combination antenna diagrams are mutually symmetrical with respect to a main beaming direction of the multiple-unit antenna radar system.

10. A method of target object angle determination by means of a multiple unit antenna radar system in which at least three feeds which are spatially offset relative to one another illuminated a joint collimator, comprising:

operating said radar system in a first operating mode in which said at least three feeds are excited separately, generating at least three corresponding antenna patterns;

operating said radar system in a second mode in which combinations of at least two of said feeds are excited simultaneously and with the same phase, generating at least two combination antenna patterns;

switching between said first mode and said second mode, depending on a location of a target object whose angle is to be determined.

* * * * *